Dec. 1, 1964  A. W. BJORK  3,159,075
COLLAPSIBLE BOLT HAVING SPRING ACTUATED EXPANDING PLUNGER
Filed Oct. 16, 1961  3 Sheets-Sheet 1

INVENTOR.
Alvin W. Bjork

INVENTOR.
Albin W. Bjork

INVENTOR.

United States Patent Office

3,159,075
Patented Dec. 1, 1964

3,159,075
COLLAPSIBLE BOLT HAVING SPRING ACTUATED EXPANDING PLUNGER
Albin W. Bjork, 34 Farquhar Road, Newtonville, Mass.
Filed Oct. 16, 1961, Ser. No. 146,079
1 Claim. (Cl. 85—87)

This invention relates in general to fastening devices and more particularly to collapsible bolts.

This application is a continuation-in-part of my co-pending application Serial No. 52,206, filed August 26, 1960, and now abandoned.

Quite often in repairing or assembling mechanical equipment it is highly desirable that one be able to install or remove bolts easily and rapidly without using expensive power equipment which many times is not available, and without using hand tools which often makes the task long, tedious, and, in some situations, such as during military combat operations, dangerous.

An object of the present invention is, therefore, to provide a new and improved bolt that can be easily and rapidly installed.

Another object of the invention is to provide a collapsible bolt that is rugged and reliable in operation.

A further object is to provide a collapsible bolt that is easily installed and easily removed.

In summary, the above objects are achieved by providing a bolt that may be collapsed upon its axis. It may then be inserted, in the collapsed position, into a nut or threaded cavity with no binding of threads. Thereafter it may be expanded so that the interior threading of the nut or cavity makes metal-to-metal threadable contact with the threadable means of the bolt. The bolt may also be provided with means for thereafter collapsing it upon its axis so it may be removed from the nut or threaded cavity.

According to the present invention, such a bolt has two, but preferably three, shank segments, threadably adapted to each other. Each shank segment has a shank segment head. These shank segments are disposed around a plunger having suitable tapered surfaces. By moving the plunger in one direction, the tapered surfaces are utilized to move the shank segments radially outward away from the axis of the bolt. A separate bolt head limits the movement of the shank segment heads to a predetermined distance. Also heat resistant silicone rubber O-rings aid in limiting the movement of the shank segments. The plunger may then be fixed in position so that the tapered surfaces will maintain the bolt in its expanded position. To collapse the bolt, the plunger is moved in the opposite direction and the tapered surfaces of the plunger are rendered ineffective to maintain the bolt in its expanded position. The silicone rubber O-rings then contract forcing the shank segments radially inward toward the axis of the bolt.

Other objects and a fuller understanding of the invention may be had by referring to the following description and claims, taken in conjunction with the accompanying drawings, in which:

Figure 2:
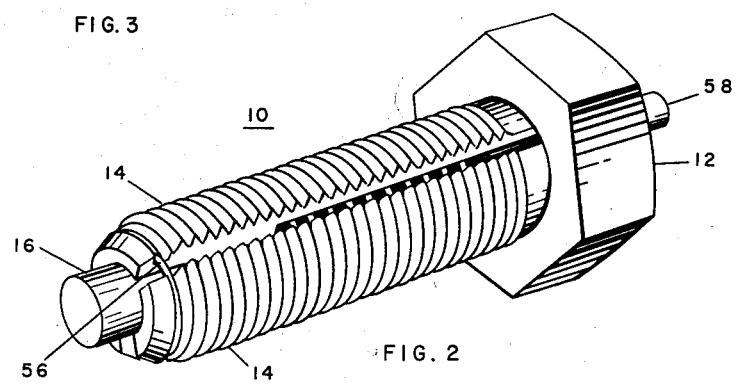
FIGURE 2 is a perspective view of the embodiment of FIGURE 1 illustrating the bolt in its expanded position.

Referring to FIGURE 2, collapsible bolt 10 comprises a separate bolt head 12, threaded shank segments 14 and plunger 16. In this embodiment, as well as in the embodiment of FIGURES 6 and 7, three shank segments preferably are used.

Figure 3:
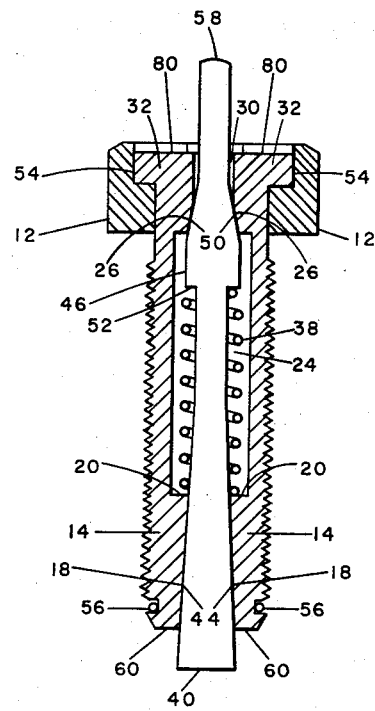
FIGURE 3 is a sectional view, in part, of the bolt of FIGURE 2.
Figure 5:
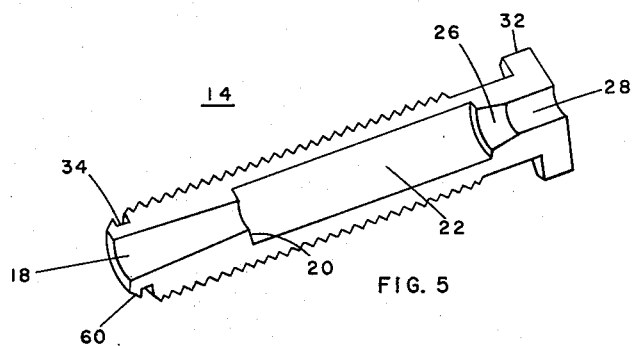
FIGURE 5 is a perspective view of a shank segment used in the bolt illustrated in FIGURE 3.

FIGURE 5 illustrates the interior detail of a shank segment 14 that may be used in the bolt of FIGURE 3. The functions of plunger way 18, compression spring footing 20, segment 22 of the spring cavity 24 (see FIGURE 3), interior tapered surface 26, segment 28 of plunger cavity 30 (see FIGURE 3), shank segment head 32 and groove 34 will be explained in more detail later.

Figure 1:
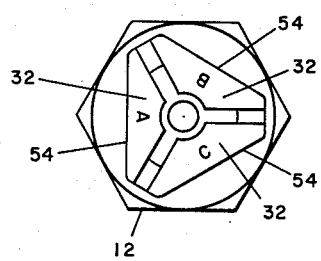
FIGURE 1 is a top view of one embodiment of the bolt of the present invention.

Referring now to FIGURE 1, each shank segment head 32 may have a letter "A," "B" or "C," or some other suitable marking, stamped into its top surface 80 (see FIGURE 3). Such markings are used to assure that shank segments 14 are arranged in the correct clockwise order, so that the lead of the threads, if extended, would form a uniform continuous threading. Obviously, if a regular bolt were cut into three segments by an infinitely thin cut, the three segments would have to be fitted together in the correct order to maintain proper continuity in the lead of the threads.

Figure 4:
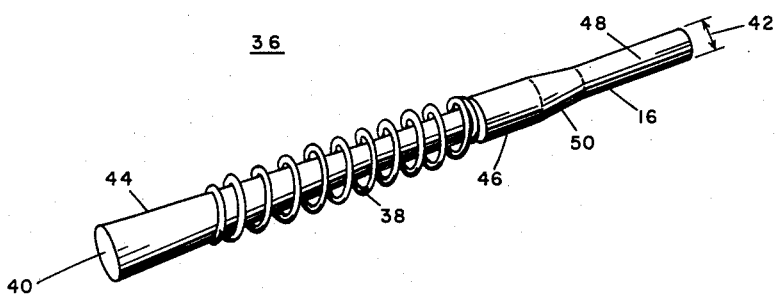
FIGURE 4 is a perspective view of the plunger assembly, a subassembly of the bolt of FIGURE 2.

In FIGURE 4, plunger assembly 36 is illustrated as consisting of plunger 16 and compression spring 38. Plunger 16 is conically tapered from end 40, for a length somewhat greater than the length of plunger way 18 (see FIGURE 5), to the smallest diameter 42 of plunger 16. Further, conically tapered surface 44 and plunger way 18 of shank segments 14 are tapered so as to mate snugly with each other. Plunger assembly 36 may be assembled by sliding compression spring 38 on plunger shank 48; holding it partially compressed; and permanently fastening spring retaining cap 46 to plunger shank 48 in any well-known manner, such as, for example, by silver soldering. Spring retaining cap 46 is located at such position that when bolt 10 is in its expanded position, a portion of conically tapered surface 44 will mate with plunger way 18 of shank segments 14 and a portion of conically tapered surface 50 of spring retaining cap 46 will mate with interior tapered surfaces 26 of shank segments 14, as illustrated in FIGURE 3.

Further, as illustrated in FIGURE 3, compression spring 38 (which may be a commercially available compression spring) seats at one end against compression spring footings 20 of shank segments 14 and seats at the other end against face 52 of spring retaining cap 46. Segments 22 of shank segments 14 form spring cavity 24. When the bolt is in either the expanded or collapsed position, spring cavity 24 must be large enough to clear compression spring 38.

All parts (except for compression spring 38, which, as above stated, may be a commercially available compression spring) may be made of the same material as in commercially available bolts and screws.

Referring to FIGURES 1 and 3, when the bolt 10 is in its expanded position, shank segment heads 32 fit snugly against surfaces 54 of bolt head 12, in response to the force exerted by conically tapered surface 50 against interior tapered surfaces 26 of shank segments 14. Furthermore, spring 38 acting against face 52 of spring retaining cap 46 keeps conically tapered surface 50 in metal-to-metal contact with interior tapered surfaces 26, and conically tapered surface 44 in metal-to-metal contact with plunger ways 18.

Shank segments 14 are limited to a predetermined maximum expansion position by surfaces 54 of bolt head 12 and by retaining O-ring 56, as illustrated in FIGURE 3. Retaining O-ring 56 may be any commercially available heat resistant silicone rubber O-ring of proper dimensions. Alternatively, commercially available retaining rings may be substituted for O-ring 56. However, since such retaining rings have a tendency to take a set when held expanded for a long period of time, I prefer to use silicone rubber O-rings.

Referring to FIGURES 1, 2 and 3, it is contemplated that bolt 10 would normally be supplied in the expanded position. To install the bolt, the user would press down end 58 of plunger 16; press shank segments 14 radially inward toward the axis of the bolt, aided by the force exerted by retaining O-ring 56; insert the collapsed bolt into the mating threaded cavity or nut; and press against end 40 of plunger 16 to force conical surfaces 50 and 26, and 44 and 18 into metal-to-metal mating contact. The threads of shank segments 14 will also be forced into metal-to-metal threadable contact with the threads of the cavity or nut. This bolt would then be removed in the ordinary manner, because it has been found that, with only one retaining O-ring 56, shank segments 14 do not collapse sufficiently for the bolt to be withdrawn without binding with the threads of the cavity or nut.

Figure 6:
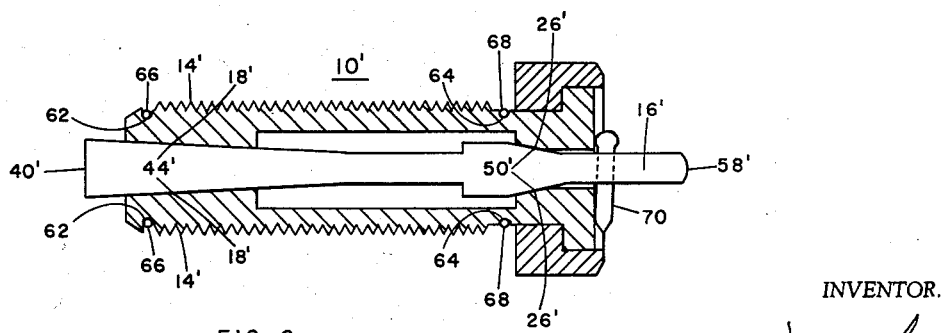
FIGURE 6 is a sectional view, in part, of another embodiment of the bolt of the present invention.
Figure 10:
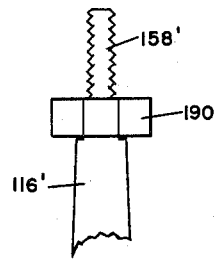
FIGURE 10 illustrates, in part, a plunger and a nut used to fix it in the expanded position.
Figure 11:
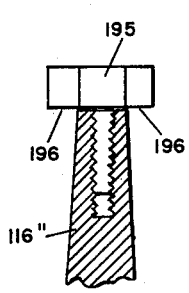
FIGURE 11 illustrates, in part, a plunger and a small bolt that may be used to fix it in the expanded position.

FIGURE 6 illustrates, partially in section, another embodiment of a collapsible bolt 10′ that can be installed and removed in the collapsed position. Again three shank segments 14′ are utilized. However, shank segments 14′ have grooves 62 and 64 designed to receive heat resistant silicone rubber O-rings 66 and 68 respectively. It is obvious that two O-rings may similarly be employed with shank segments 14 of FIGURE 3. In this embodiment the function performed by compression spring 38 is performed by cotter pin 70. Plunger 16′ may also be manufactured from one piece of material, thus dispensing with the step of fastening spring retaining cap 46 to plunger 16′. In the expanded position, surfaces 50′ and 26′, and 44′ and plunger ways 18′, are held in mating metal-to-metal contact by cotter pin 70 which prevents any movement of said surfaces from such contact. It is to be understood that other well-known means can be utilized to hold plunger 16′ in the expanded position, instead of utilizing cotter pin 70. Two such means are illustrated in FIGURES 10 and 11 and will be discussed later.

To collapse bolt 10′ of FIGURE 6, simply remove cotter pin 70 and press in on end 58′ of plunger 16′. When conical surface 44′ clears plunger ways 18′ and conical surface 50′ clears interior tapered surfaces 26′, O-rings 66 and 68 will force shank segments 14′ radially inward toward the axis of the bolt and hold the shank segments 14′ firmly in the collapsed position. The bolt can then easily be withdrawn from a threaded cavity or nut.

Bolt 10′ can also be inserted in a threaded cavity or nut in the collapsed position. Thereafter end 40′ is pushed in until conical surfaces 44′ and 18′, and 50′ and 26′ make firm metal-to-metal contact. Cotter pin 70 is then installed.

Figure 7:
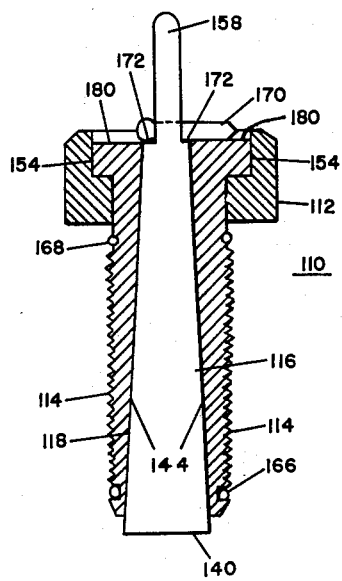
FIGURE 7 is a sectional view, in part, of the preferred embodiment of the bolt of my invention, illustrated in the expanded position.
Figure 8:
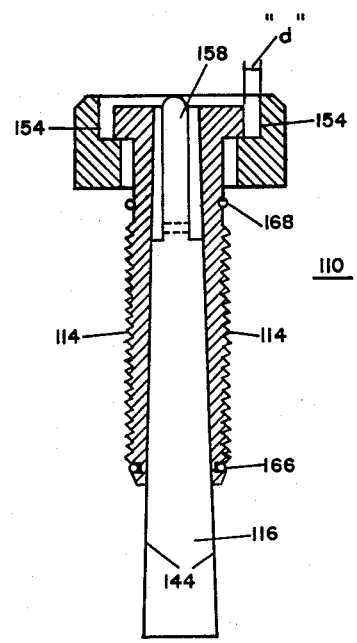
FIGURE 8 is a sectional view, in part, of the bolt of FIGURE 7, illustrated in the collapsed position.

The embodiment of my invention illustrated in FIGURES 7 and 8 is preferred because it will withstand greater shear forces than the embodiments of FIGURES 3 and 6.

Referring to FIGURE 7, my preferred embodiment comprises a separate bolt head 112, threaded shank segments 114, plunger 116, and cotter pin 170. Again, three shank segments are preferably used.

Figure 9:
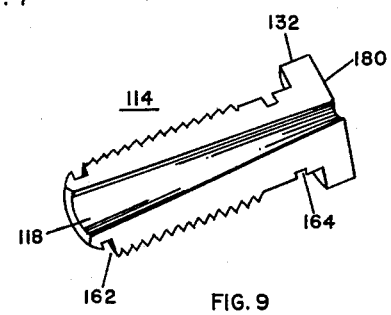
FIGURE 9 is a perspective view of a shank segment used in the bolt of FIGURE 7.

FIGURE 9 illustrates the interior detail of a shank segment 114. The functions of plunger way 118, grooves 162 and 164, and shank segment head 132 will be explained in more detail hereinafter.

Top surfaces 180 of shank segment heads 132 should have markings suitable to assure their arrangement in the correct order, as heretofore explained.

Plunger 116 is conically tapered from end 140 for a length somewhat greater than the length of plunger way 118. Thus when bolt 110 is in the expanded position, end 140 of plunger 116 will protrude somewhat from shank segments 114, as illustrated. Although I prefer such a protuberance, it is not necessary.

It will be apparent that tapered surface 144 of plunger 116 and plunger ways 118 must complement each other so as to mate snugly.

Again, all parts may be made of the same material as in commercially available bolts and screws.

Plunger 116 is illustrated in FIGURE 7 as being tapered to footing 172, which when bolt 110 is in the expanded position, is substantially coplanar with top surfaces 180 of shank segment heads 132. Cylindrical end 158 of plunger 116 is illustrated in FIGURE 7 as having a hole drilled therein through which cotter pin 170 may be passed. Again, the function of cotter pin 170 is to hold plunger 116 in the expanded position. In this position, tapered surface 144 forces shank segments 114 radially outward against the restraining forces exerted by surfaces 154 of bolt head 112, and by commercially available heat resistant silicone rubber O-rings 166 and 168.

To collapse bolt 110, remove cotter pin 170 and press cylindrical end 158 of plunger 116 in to the position illustrated in FIGURE 8. As plunger 116 is pressed in, O-rings 166 and 168 contract, causing shank segments 114 to move radially toward the axis of bolt 110.

Collapsed bolt 110 may easily be removed from a threaded cavity or nut (not shown) if shank segments 114 collapse sufficiently for the threads of shank segments 114 to completely clear the interior threads of said threaded cavity or nut. The total collapsing distance "d" (see FIGURE 8) is preferably slightly greater than the depth of the threads on shank segments 114 to assure complete thread disengagement.

Instead of using cotter pin 170, end 158′ may be threaded to receive a standard size nut 190 as illustrated in part in FIGURE 10. Nut 190 seats firmly against surfaces 180 when bolt 110 is in the expanded position. When plunger 116′ is pressed in to expand bolt 110, nut 190 may be threadably engaged with end 158′. Thereafter, as nut 190 is tightened down on surfaces 180, it will draw plunger 116′ up into the expanded position.

Another embodiment utilized to hold plunger 116″ in the expanded position is illustrated in FIGURE 11. Here plunger 116″ is drilled and tapped to receive a small bolt 195. As bolt 195 is tightened, its under surface 196 will contact surfaces 180 of shank segments 114. As tightening of bolt 195 continues, plunger 116″ will be drawn up into the fully expanded position.

Figure 12:
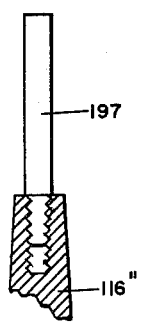
FIGURE 12 illustrates, in part, means whereby a plunger may be moved so as to collapse the bolt.

When bolt 195 is nearly removed, it may not be long enough to permit sufficient collapsing of shank segments 114. In this event, bolt 195 may be removed and threaded cylindrical piece 197 threaded into plunger 116″ as illustrated in FIGURE 12. A sharp blow on the exposed end of cylindrical piece 197 will then drive plunger 116″ in sufficiently for shank segments 114 to collapse said distance "d."

Other configurations, than those illustrated in FIGURES 10 and 11, will occur to those skilled in the art.

Although the invention has been described in terms of several illustrative embodiments, it is to be understood that the invention has broader applications and is in no way limited by said embodiments.

Further modifications will occur to those skilled in the art and all such are considered to fall within the spirit and scope of the invention as defined in the appended claim.

I claim:

A collapsible bolt for mating with an interior screw thread, comprising:
- a plurality of shank segments, each having a head portion, complementary external threads on its outer side, and tapered surfaces on its inner side near the head portion and near the end remote therefrom, and each segment also having a recess intermediate said tapered surfaces;
- a bolt head disposed exteriorly of said head portions and adapted to limit the radial outward movement of said heads to a predetermined distance greater than the depth of said threads;
- a slidable plunger disposed interiorly of said segments and having tapered surfaces disposed in contact with the tapered surfaces of the shank segments to produce parallel lateral motion of said segments through said predetermined distance in response to sliding motion of said plunger, said plunger having a shoulder disposed intermediate its tapered surfaces;
- resilient means disposed exteriorly of said segments to exert a collapsing force upon said segments; and
- a compression spring internally mounted within said recess of said segments and about said plunger, one end of said spring being disposed against the said shoulder of the plunger and the other end of the spring against the end of the recess remote from the head portion.

References Cited in the file of this patent

UNITED STATES PATENTS

| | | |
|---|---|---|
| 647,357 | Baker | Apr. 10, 1900 |
| 1,442,626 | McGee | Jan. 16, 1923 |
| 2,320,493 | Wallace | June 1, 1943 |
| 2,570,618 | Werner | Oct. 9, 1951 |
| 2,775,155 | Tompkins | Dec. 25, 1956 |